United States Patent
Lickfelt

(10) Patent No.: US 9,756,296 B2
(45) Date of Patent: Sep. 5, 2017

(54) PERSONALIZED AMBIENT LIGHTING

(71) Applicant: Honda Motor Co., Ltd., Tokyo (JP)

(72) Inventor: Brian K. Lickfelt, Powell, OH (US)

(73) Assignee: Honda Motor Co., Ltd., Tokyo (JP)

(*) Notice: Subject to any disclaimer, the term of this patent is extended or adjusted under 35 U.S.C. 154(b) by 0 days.

(21) Appl. No.: 15/335,694

(22) Filed: Oct. 27, 2016

(65) Prior Publication Data

US 2017/0050561 A1    Feb. 23, 2017

Related U.S. Application Data

(63) Continuation-in-part of application No. 14/831,954, filed on Aug. 21, 2015, now Pat. No. 9,505,345.

(51) Int. Cl.
| | |
|---|---|
| B60Q 3/02 | (2006.01) |
| H04N 7/18 | (2006.01) |
| B60Q 1/00 | (2006.01) |
| H05B 33/08 | (2006.01) |
| B60Q 3/80 | (2017.01) |
| H04N 5/225 | (2006.01) |
| H04N 9/04 | (2006.01) |

(52) U.S. Cl.
CPC .......... H04N 7/183 (2013.01); B60Q 1/0094 (2013.01); B60Q 3/80 (2017.02); H04N 5/2256 (2013.01); H05B 33/0863 (2013.01); H05B 33/0869 (2013.01); H05B 33/0872 (2013.01); B60Q 2400/20 (2013.01); B60Q 2400/40 (2013.01); H04N 7/188 (2013.01); H04N 9/045 (2013.01)

(58) Field of Classification Search
CPC .... H05B 37/02; H05B 37/0218; H05B 33/08; H05B 33/0845; H05B 33/0863; H05B 33/0869; B60Q 3/00; B60Q 3/01; B60Q 3/02; B60Q 3/05
See application file for complete search history.

(56) References Cited

U.S. PATENT DOCUMENTS

| | | |
|---|---|---|
| 5,975,728 A | 11/1999 | Weyer |
| 6,575,607 B1 | 6/2003 | Klemish et al. |
| 8,258,704 B2 | 9/2012 | Brant |
| 8,476,832 B2 | 7/2013 | Prodin et al. |
| 2006/0171704 A1* | 8/2006 | Bingle ................ B60R 11/04 396/419 |
| 2008/0191626 A1 | 8/2008 | Salter et al. |
| 2013/0033582 A1* | 2/2013 | Sun .................. H04N 13/0018 348/47 |
| 2013/0130674 A1 | 5/2013 | DeWind et al. |

(Continued)

FOREIGN PATENT DOCUMENTS

CN    201985921    9/2011

*Primary Examiner* — Thai Pham
(74) *Attorney, Agent, or Firm* — Rankin, Hill & Clark LLP

(57) ABSTRACT

According to one aspect, personalized vehicle ambient lighting on a vehicle is provided. Presence information associated with a user is detected. Image color information is captured from an image is taken by a camera such that the user is within the image. Image color information associated with the user is extracted from the image. Red, green, blue (RGB) color values indicative of a color associated with the user are created. A light emitting diode (LED) activation scheme based on the RGB color values associated with the user is generated. Portions of a plurality of RGB LEDs are activated based on the LED activation scheme.

20 Claims, 6 Drawing Sheets

(56) References Cited

U.S. PATENT DOCUMENTS

| | | | |
|---|---|---|---|
| 2013/0322863 A1* | 12/2013 | Lee | H04N 5/23212 396/125 |
| 2014/0104464 A1* | 4/2014 | Spears | H04N 9/04 348/272 |
| 2015/0273092 A1* | 10/2015 | Holub | A61L 2/10 250/492.1 |
| 2016/0054842 A1* | 2/2016 | Yamada | G01C 21/3664 345/173 |

* cited by examiner

PERSONALIZED AMBIENT LIGHTING

CROSS-REFERENCE TO RELATED APPLICATIONS

This application is a continuation-in-part (CIP) of and claims priority to U.S. Non-Provisional patent application Ser. No. 14/831,954 (Attorney Docket No. HRA-39672) entitled "SYSTEM AND METHOD FOR VEHICLE AMBIENT LIGHTING", filed on Aug. 21, 2015; the entirety of the above-noted application is incorporated by reference herein.

BACKGROUND

Vehicles typically have interior lighting for illuminating an interior of the vehicle. Vehicle interior lighting can include a variety of different illumination schemes, such as providing an overhead light in a flood light configuration to light the entire interior or providing reading lights concentrating the light into tightly focused spot light configurations useful for reading, for example.

Ambient lighting typically consists of one or more light sources which provide a soft, diffused lighting throughout much of the vehicle interior. Light emitting diodes (LEDs) are used for generating vehicle ambient illumination. White LEDs have been commonly used which provide white ambient lighting. More recently, colored ambient lighting is available. Colored light can be generated using colored lenses over white lights to produce ambient light of a predetermined color as defined by the color of the lens used. Alternatively, LEDs having a color other than white can be used. Combinations of colored Red, Green, and Blue (RGB) LEDs are also used to produce colored ambient lighting.

Many ambient lighting systems do not enable the occupant to choose the color of the ambient light illuminating the vehicle interior. Some systems provide the occupant with a limited choice of preselected ambient lighting colors to choose from. It is desirable to enable the occupant to select her own, personalized color of ambient light for illuminating the vehicle interior.

BRIEF DESCRIPTION

In accordance with one aspect of the disclosure, a vehicle ambient lighting system for producing personalized, user-defined color of ambient light is provided. The vehicle ambient lighting system includes a camera having an image sensor capturing image color information from a colored surface forming a user defined ambient lighting color selection. An image processor operably connected to the image sensor receives the image color information and creates RGB color values representing the color of the colored surface. A controller processor operably connected to the image processor generates a light emitting diode (LED) activation scheme, and an LED driver activates a plurality of RGB LEDs in accordance with the LED activation scheme to produce vehicle ambient lighting having a color which matches the color of the ambient lighting color selection.

In accordance with another aspect of the disclosure, a vehicle ambient lighting system for producing user-defined color of ambient light using a human machine interface (HMI) is provided. The vehicle ambient lighting system includes a camera having an image sensor capturing image color information from a colored surface forming a user defined ambient lighting color selection. An image processor is operably connected to the image sensor receives the image color information and creates red, green, blue (RGB) color values representing the color of the colored surface. A controller having a processor operably connected to the image processor generates a light emitting diode (LED) activation scheme using the RGB color values. A human machine interface provides a user interface for operating the vehicle ambient lighting. An LED driver is connected to the controller for activating a plurality of RGB LEDs in accordance with the LED activation scheme to produce vehicle ambient lighting having a color matching the user defined ambient lighting color selection.

In accordance with another aspect of the disclosure, a method of generating colored vehicle ambient lighting is provided. The method includes presenting a colored surface forming a user defined ambient lighting color selection to a vehicle camera image sensor, triggering the camera to capture image color information from the colored surface, creating RGB color values representing the color of the colored surface, generating an LED activation scheme using the RGB color values, and activating a plurality of RGB LEDs in accordance with the LED activation scheme to generate vehicle ambient lighting having a color matching the user defined ambient lighting color selection.

According to one aspect, a system for personalized vehicle ambient lighting on a vehicle includes a vehicle entry sensor, a camera, a controller, an image processor, a plurality of red, green, blue (RGB) light emitting diodes (LEDs), and an LED driver. The plurality of RGB LEDs may be a first plurality of RGB LEDs associated with a first lighting system. The vehicle entry sensor detects presence information associated with a user. The camera includes an image sensor capturing image color information from an image taken by the camera. The controller includes a processor operably connected to the camera and controls the camera to take the image when the user is in view of the camera. The image processor extracts image color information associated with the user from the image and creates RGB color values indicative of a color associated with the user. The processor for the controller generates an LED activation scheme based on the RGB color values associated with the user. The LED driver may be a first LED driver of multiple LED drivers is connected to the controller and the first plurality of RGB LEDs and activates portions of the first plurality of RGB LEDs based on the LED activation scheme to produce personalized vehicle ambient lighting having a color matching the color associated with the user.

According to one aspect, a method for personalized vehicle ambient lighting on a vehicle may include detecting presence information associated with a user, capturing image color information from an image taken by the camera such that the user is within the image, extracting image color information associated with the user from the image, creating red, green, blue (RGB) color values indicative of a color associated with the user, generating a light emitting diode (LED) activation scheme based on the RGB color values associated with the user, and activating portions of a plurality of RGB LEDs based on the LED activation scheme.

According to one aspect, a method for personalized vehicle ambient lighting on a vehicle may include detecting presence information associated with a user, capturing image color information from an image taken by the camera such that the user is within the image, extracting a first and second image color information associated with the user from the image, creating first and second red, green, blue (RGB) color values indicative of a first and second color associated with the user based on the extracted first and second image color information, generating a first and second light emitting diode (LED) activation scheme based on the first and second RGB color values associated with the user, and activating portions of a first and second plurality of RGB LEDs based on the first and second LED activation schemes, respectively.

DETAILED DESCRIPTION

It should be understood that the description and drawings herein are merely illustrative and that various modifications and changes can be envisioned without departing from the present disclosure. It will also be appreciated that the various identified components of the exemplary vehicle ambient lighting system disclosed herein are merely terms of art that may vary from one manufacturer to another and should not be deemed to limit the present disclosure.

Figure 1:
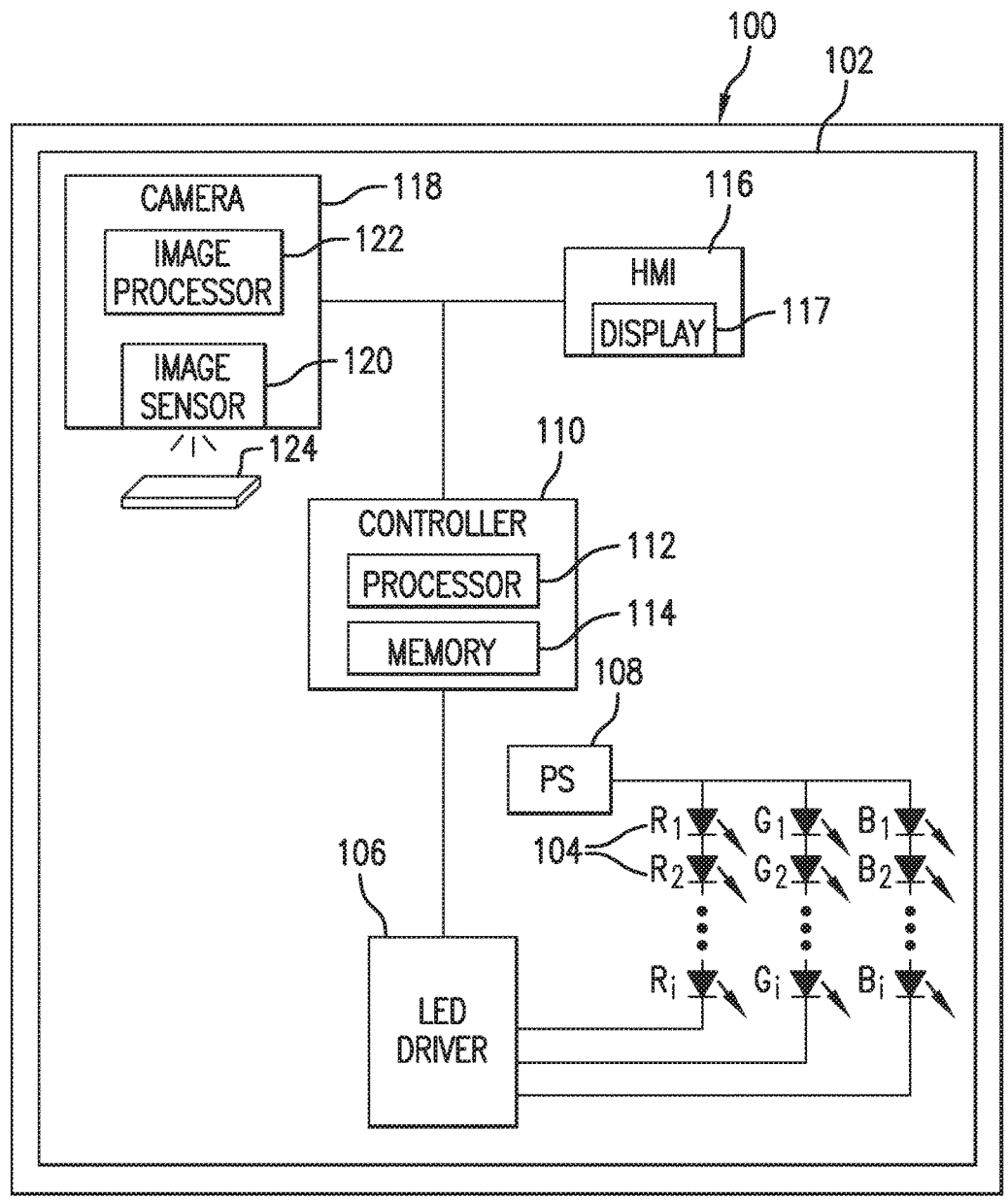
FIG. 1 is a schematic illustration of a system for generating personalized color of vehicle ambient lighting, according to one or more embodiments.

The embodiments will now be described with reference to the accompanying drawings, wherein like reference numerals designate corresponding or identical elements throughout the various drawings. Referring now to FIG. 1, a schematic illustration of a vehicle is shown generally at 100. The vehicle can be an automobile, car, truck, minivan, sport utility vehicle (SUV), or another type of vehicle having an interior vehicle ambient lighting system 102. The vehicle ambient lighting system 102 includes a plurality of light emitting diodes (LEDs) which include Red ($R_1, R_2, \ldots R_i$), Green ($G_1, G_2, \ldots G_i$) and Blue ($B_1, B_2, \ldots B_i$) diodes, also known as RGB LEDs 104, which are activated to produce ambient lighting to illuminate the interior of the vehicle 100. The RGB LEDs 104 can also include a plurality of clear LEDs, according to one or more aspects.

An LED driver 106 is electrically connected to the RGB LEDs 104 to selectively activate the individual red, green, and blue LEDs to any desired illumination intensity, thereby creating light of variable intensity having any desired color. One or more power supplies 108 provide the RGB LEDs 104 with sufficient voltage and current to provide the wide range of illumination intensity sufficient for generating any desired color.

A controller 110 is operatively coupled to the LED driver 106 for controlling the operation of the vehicle ambient lighting system 102. The controller 110 is a computing device which includes one or more processors 112 programmed to perform computer-executable instructions embodied on computer-readable storage media or a memory 114. When executed by the at least one processor 112, the computer-executable instructions cause the processor to perform the operations described herein, including controlling the vehicle ambient lighting system 102 to create a personalized, user-defined color of illumination, such as according to the method 200 of FIG. 2.

The controller 110 provides the LED driver 106 with an LED activation scheme for activating select RGB LEDs 104 to sufficient respective illumination intensities so that the combined effect produces ambient light of variable intensity having any desired color, as described in greater detail herein. The controller 110 can also control the vehicle ambient lighting system 102 in a variety of conventional manners such as turning the vehicle ambient lighting system 102 on and off, controlling general illumination intensity, lighting different locations within the vehicle, etc.

A human machine interface (HMI) 116 is operatively coupled to the controller 110 for enabling a user to operate the vehicle ambient lighting system 102. The HMI 116 can include a display 117, such as a touch screen, having a graphical user interface (GUI), for example. The user can control the vehicle ambient lighting system 102 using the HMI 116 to produce ambient lighting of any desired color in a manner described in greater detail herein.

The vehicle 100 includes a camera 118 for use in the vehicle ambient lighting system 102. The camera 118 can be a dashboard camera, a backup camera, or any other suitable camera having an image sensor 120 capable of capturing a color image, also referred to as a digital picture. The image sensor 120 can be a semiconductor charge-coupled device (CCD), or active pixel sensor in complementary metal-oxide-semiconductor (CMOS), or other type of image sensor used in cameras.

The camera 118 includes an image processor 122 which receives color image data for an object captured by the image sensor 120 when the camera is triggered to take a picture. In the examples described herein, the object is a colored surface 124 associated with a color which may be used for desired ambient lighting. The colored surface 124 can be a color swatch, a paint chip, a photograph, or any colored surface from which the user intends to create matching colored ambient lighting in the vehicle 100. The image processor 122 receives the color image data from the image sensor 120 and creates RGB color values which represent the color of the colored surface 124. In one or more embodiments, the image processor 122 is separate from the camera 118. The RGB color values are derived in accordance with an RGB color model appropriate for the specific RGB LEDs 104 used in the ambient lighting system. This RGB color model can be predetermined using LED data supplied at the time of manufacture of the vehicle ambient lighting system 102. For example, the RGB color model can be a sRGB color model. As another example, the RGB color model can be Adobe RGB, which includes a larger range (e.g., gamut) of colors than sRGB, especially in the blues and cyans, to produce a larger variety of ambient lighting colors. The RGB color model can be updated or re-defined at periodic intervals, or as desired.

The controller 110 receives the RGB color values from the image processor 122. For example, the RGB color values can be stored in a color look-up table in the memory 114 of the controller 110. The controller 110 creates an RGB LED activation scheme using the RGB color values for selectively activating the RGB LEDs 104 with sufficient intensity such that the combined effect produces ambient illumination having a color which matches the color of the colored surface 124. The controller 110 communicates with the LED driver 106 using the LED activation scheme for activating the RGB LEDs 104 to produce the colored ambient light. Some or all of the RGB LEDs 104 can be illuminated to produce the appropriate color.

Figure 2:
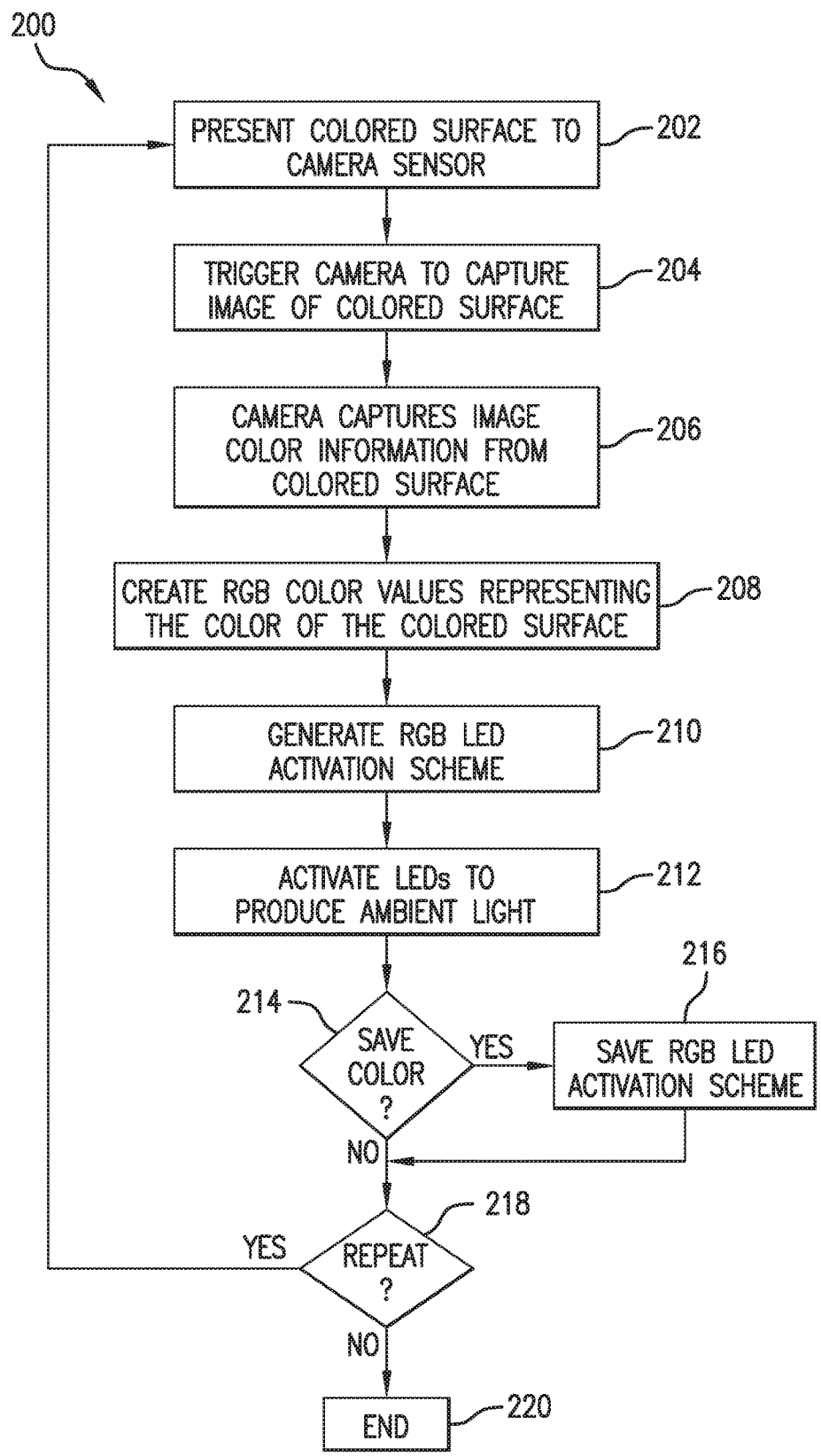
FIG. 2 is a flow diagram of a method of generating a personalized vehicle ambient lighting color for the system of FIG. 1, according to one or more embodiments.

Referring now to FIG. 2, a method of generating vehicle ambient lighting having a personalized, user-defined color is shown generally at 200. A user operates the vehicle ambient lighting system 102 using the HMI 116 described above. The user begins operating the ambient lighting color selection routine using the HMI GUI. The user is instructed to present a colored surface to the camera at 202 and trigger the activation of the camera. Upon receiving the trigger signal at 204, the camera 118 takes an image of the color surface capturing image color information at 206 and sends the image data to the image processor 122. The image processor 122 generates RGB color values representing the color of the colored surface at 208.

The image processor 122 sends the RGB color values to the controller 110 which generates an RGB LED activation scheme at 210 for activating select RGB LEDs 104 at suitable intensities to generate ambient lighting having a color which matches the color of the colored surface, as described above. The controller 110 communicates with the LED driver 106 using the RGB LED activation scheme to activate the RGB LEDs 104 at 212 and produce an interior ambient light having a color which matches the color of the colored surface corresponding to the user defined ambient lighting color selection.

The HMI 116 then queries the user at 214, generating a request or a prompt to save the LED activation scheme. Upon receiving an indication from the user (e.g., the response to the prompt of 214) to save the LED activation scheme in response to the request, the LED activation scheme is saved in memory at 216. The HMI can produce a request that the user enter a storage identifier for the LED activation scheme, according to one or more aspects. Thus, the ambient lighting color selection can be saved using any suitable naming convention and made available for future retrieval.

In one or more embodiments, the LED activation scheme can be saved in association with the user, such as for example, by using a user ID or account number, or in any other suitable manner. The LED activation scheme can be saved in association with the owner of the fob that previously started the vehicle, or activated the ignition. The LED activation scheme is discarded, if not saved.

The HMI then queries the user at 218, generating a request to create another user defined ambient lighting color selection. Upon receiving an indication from the user to proceed, the process is repeated beginning again at 202. Alternatively, if the user chooses not to repeat or continue, the process or method 200 ends at 220.

The systems and methods of generating user defined ambient lighting colors disclosed herein enables a vehicle owner to chose a color to match his or her exact mood and desire, thereby creating a more personalized driving experience.

Figure 3:
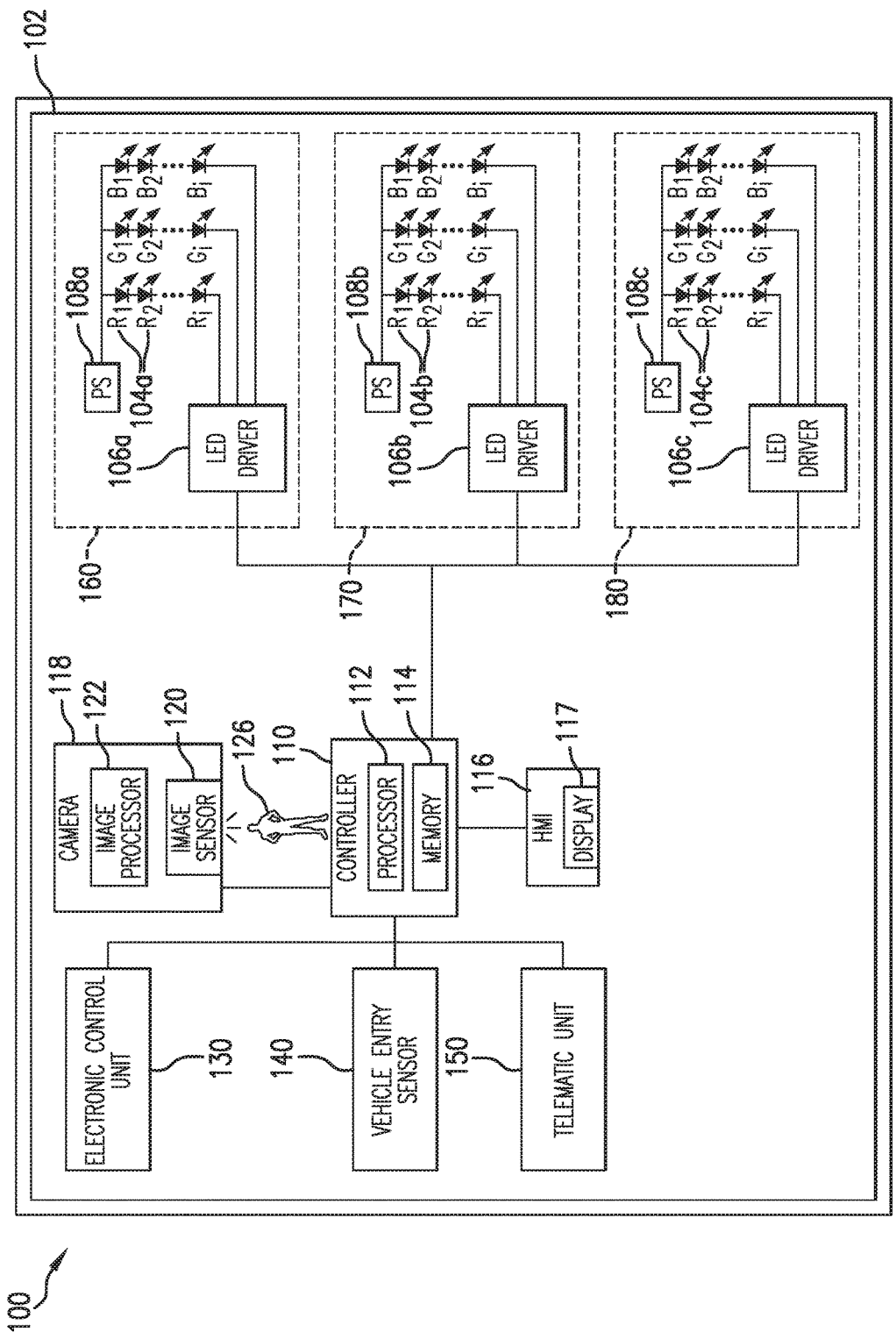
FIG. 3 is a schematic illustration of a system for generating personalized color of vehicle ambient lighting, according to one or more embodiments.

FIG. 3 is a schematic illustration of a system 102 for generating personalized color of vehicle ambient lighting, according to one or more embodiments. In FIG. 3, a vehicle 100 includes the system 102 for generating personalized color of vehicle ambient lighting. The system 102 includes one or more of the components of the system of FIG. 1. The system 102 includes a controller 110, a human machine interface (HMI) 116, a camera 118, an electronic control unit (ECU) 130 which may be a body control module (BCM), a vehicle entry sensor 140, a telematics unit 150, and one or more lighting systems 160, 170, 180. The camera 118 includes an image sensor 120 and an image processor 122. The controller 110 includes a processor 112 and a memory 114. The HMI 116 includes a display 117. Each one of the first, second, and third lighting systems 160, 170, 180 includes a first, second, and third LED driver (106a, 106b, 106c), a first, second, and third power supply (108a, 108b, 108c), and a first, second, and third plurality of RGB LEDs (104a, 104b, 104c). In one or more embodiments, a single LED driver may drive different groups or pluralities of RGB LEDs 104a, 104b, 104c. Similarly, the RGB LEDs 104a, 104b, 104c may be tied to a common power supply in other embodiments. Regardless, the controller 110 may control different pluralities or groups of RGB LEDs 104a, 104b, 104c. Further, in one or more embodiments, processing performed by the image processor 122 may be alternatively or in combination, performed by the processor 112 of the controller 110 or be separate from both the camera 118 and the controller 110.

In any event, the lighting systems 160, 170, and 180 of the vehicle 100, may be non-driving related lighting systems, such as a puddle light system, an internal ambient lighting system, an external ambient lighting system, etc. One or more of these lighting systems 160, 170, or 180 may be red, green, and blue or RGB capable in a manner consistent with the RGB LEDs 104 of FIG. 1, thereby enabling the lighting systems 160, 170, and 180 to produce most any color by activating different RGB LEDs of the plurality of RGB LEDs. Similarly, the power supplies 108a, 108b, and 108c and the LED drivers 106a, 106b, and 106c may perform similarly to the power supply 108 of FIG. 1 and the LED driver 106 of FIG. 1.

The system 102 for generating personalized color of vehicle ambient lighting of FIG. 3 utilizes the camera 118 to capture a color associated with a user approaching the vehicle, detected by the vehicle entry sensor 140, such as a driver with a key fob, and customize the ambient lighting of one or more of the lighting systems 160, 170, or 180 (e.g., a puddle light system, internal ambient lighting system, or external ambient lighting system, etc.) accordingly. In other words, the ambient lighting may be tuned individually based on the user walking or approaching the vehicle 100.

The vehicle entry sensor 140 may detect presence information associated with a user approaching the vehicle. The vehicle entry sensor 140 may detect this presence information in a variety of ways according to several embodiments. For example, the vehicle entry sensor 140 may be a touch sensor (e.g., capacitive touch sensor, pressure sensor, etc.) on a door or door handle of the vehicle 100. In this example, the vehicle entry sensor 140 detects presence information based on contact between the user and the door or the door handle of the vehicle where the touch sensor is located or mounted. However, it will be appreciated that other types of sensors or proximity sensors may be used to detect presence information of an approaching user. Examples of sensors include capacitive, inductive, magnetic, proximity, passive sensors, optical sensors, thermal sensors, photocells, radar, sonar, wireless, ultrasonic, fiber optic, Hall-effect sensors, etc.

As another example, a key fob may have a magnet mounted thereon and when a user holding the key fob approaches the vehicle, the magnet may trigger the vehicle entry sensor 140 and alert the system 102 for generating personalized color of vehicle ambient lighting that the user is within a proximity or a threshold distance of the vehicle 100. As such, the vehicle entry sensor 140 may detect presence information of a user based on a proximity of the key fob from the vehicle entry sensor 140. In any event, when the vehicle entry sensor 140 detects a user, the ECU 130 or the controller 110 may issue a command to the camera 118 to capture an image of the user 126. For example, the camera 118 may be mounted on the door handle or at a location on the vehicle 100 which enables a clear shot or image of the user 126 to be taken.

The controller 110 may order the camera 118 or the image sensor 120 of the camera 118 to capture an image of the user 126. In one or more embodiments, the controller 110 may identify the user 126, one or more articles of clothing or attire of the user 126, and cause the image sensor 120 to capture one or more images of the user 126. The controller 110 may control the camera 118 or image sensor 120 thereof to take or capture the image such that the user 126 is in view of the camera 118. In this way, the controller 110 controls the camera 118 to capture the image such that the user 126 is within the image. In one or more embodiments, the controller 110 may control panning of the camera 118, if available, motion tracking, or focus lock on the user 126 while the user 126 is walking, moving, or approaching the vehicle 100.

The camera 118 may be a Multiview camera and may include an image sensor 120 and the image processor 122. As previously discussed, the image sensor 120 may capture image color information from an image taken or captured by the camera 118. Because the controller 110 commands the camera 118 to capture images of the user 126, the image color information of such an image includes image color information associated with the user 126. According to one aspect, the camera 118 may take a color cue from the driver's attire or the passenger's attire.

The image processor 122 may extract image color information associated with the user from the image. In one or more embodiments, the processor 112 or the image processor 122 may identify one or more articles of clothing of the user and extract respective image color information associated therewith. In other words, the image processor 122 may extract image color information associated with an article of clothing of the user 126 based on the image captured by the image sensor 120. When the user 126 is wearing multiple articles of clothing or accessories or other attire, the image processor 122 may determine and extract one or more sets of image color information (e.g., primary image color information, secondary image color information, tertiary image color information, predominant image color information, etc.). Whether a color is primary, secondary, tertiary, etc. may be based on an amount of two-dimensional area that color occupies in the image. A predominant color may be defined as occupying a predetermined percentage or greater or associated with a predetermined area ratio (e.g., 2:1 of the 2-D area), etc. In this way, the image processor 122 may determine a color associated with the user 126.

The image processor 122 may create red, green, blue (RGB) color values associated with one or more sets of the image color information. In other words, the image processor 122 may create one or more RGB color values indicative of a color associated with the article of clothing of the user 126 or a color associated with the user 126. As a result, the image processor 122 may create RGB color values for a predominant color, a primary color, a secondary color, a tertiary color, etc.

The processor 112 or the controller 110 may generate a light emitting diode (LED) activation scheme based on one or more of the RGB color values associated with the user (or the user's attire, clothing, or accessories). According to one aspect, different lighting systems of 160, 170, and 180 may be provided with different LED activation schemes. In other words, depending on the number of articles of clothing the user is wearing or the number of lighting systems 160, 170, 180 installed in the vehicle 100, a mode of the system 102, etc., any number of LED activation schemes may be generated. For example, if the vehicle 100 includes two lighting systems 160 and 170, the processor 112 may merely generate two (e.g., a first and a second) LED activation schemes based on the color of the user's shirt and pants, respectively. Alternatively, if the system 102 is in an ambient mode, the processor 112 may generate a single LED activation scheme based on the predominant color detected in the image. In other modes, the processor 112 may generate additional schemes (which may be implemented at different points in time), for example. The LED activation schemes may correspond to one or more of the colors described above (e.g., predominant color, primary color, secondary color, tertiary color, etc.) or may interweave one or more of these colors at different points in time, phasing in and out among different LED activation schemes, similarly to a screen-saver.

As a result, the first LED driver 106*a* may activate portions of the first plurality of RGB LEDs 104*a* based on the first LED activation scheme, thereby causing the first plurality of RGB LEDs 104*a* to exhibit or produce a color according to the corresponding LED activation scheme (e.g., which may be the user's shirt color) or otherwise produce personalized vehicle ambient lighting having a color matching the color associated with the user 126 (or associated article of clothing). According to the example where the processor 112 generates two LED activation schemes (based on the color of the user's shirt and pants), the second LED driver 106*b* may activate portions of the second plurality of RGB LEDs 104*b*, which causes these LEDs to produce the secondary color (e.g., which may be the user's pants color).

According to one aspect, the camera 118 may take a color cue based on a time of day, weather report, climate determination, outside temperature, etc. when image color information associated with the user is unavailable. This may occur for a variety of different reasons. For example, if the camera 118 or the image sensor 120 malfunctions, the image is out of focus, the image is captured without the user 126 in the image, an obstacle is in the way (e.g., a bird flies in between the camera 118 and the user 126 during image capture), then image color information associated with the user would be unavailable. The image processor 122 or the processor 112 may use object recognition algorithms or software to detect whether the user 126 is captured within the image. If it is determined that the image color information associated with the user is unavailable, the processor 112 may generate the LED activation scheme based on one or more alternatives.

According to one aspect, the camera 118 may take a color cue based on a predetermined profile, a predetermined theme, or a predetermined color palette when color information is unavailable. This information may be obtained from the memory 114 of the controller 110 or from the telematics unit 150 and passed to the controller 110. According to another aspect, the processor 112 may generate the LED activation scheme based on a profile associated with the key fob, a time of day, a weather report, a predetermined color palette, or randomly when image color information associated with the user is unavailable. This information may be obtained from the telematics unit 150 via a telematics channel. The profile information or the predetermined color palette may be stored on the memory 114, while the time of day or weather report may be received via the telematics unit 150. As such, when it is cloudy, for example, the LED activation scheme may cause one of the sets of RGB LEDs 104a, 104b, or 104c to produce a grey color (e.g., thereby matching the color of the clouds). Further, the LED activation scheme may be tuned based on the intensity of the weather (e.g., if it is windy or more rainy, change colors, intensity, pulse of the RGB LEDs 104a, 104b, or 104c based on the intensity thereof).

In other embodiments, the LED activation scheme may be updated on a continual basis or be based on a speed at which the user 126 is walking or a distance between the user 126 and the vehicle 100. For example, the LED activation scheme may include an adjustment to a brightness, an intensity, or a duration of activation based on a proximity of the user 126 to the vehicle 100. In this example, the RGB LEDs 104a, 104b, or 104c may be illuminated brighter or more intensely as the user 126 approaches the vehicle 100 more closely. As another example, the LED activation scheme may include an adjustment to a brightness, an intensity, or a duration of activation based on the speed of the user or a walking pattern for the user. In this example, the RGB LEDs 104a, 104b, or 104c may be illuminated brighter or more intensely as the user 126 takes each step so that the LEDs pulse as the user 126 walks.

Figure 4:
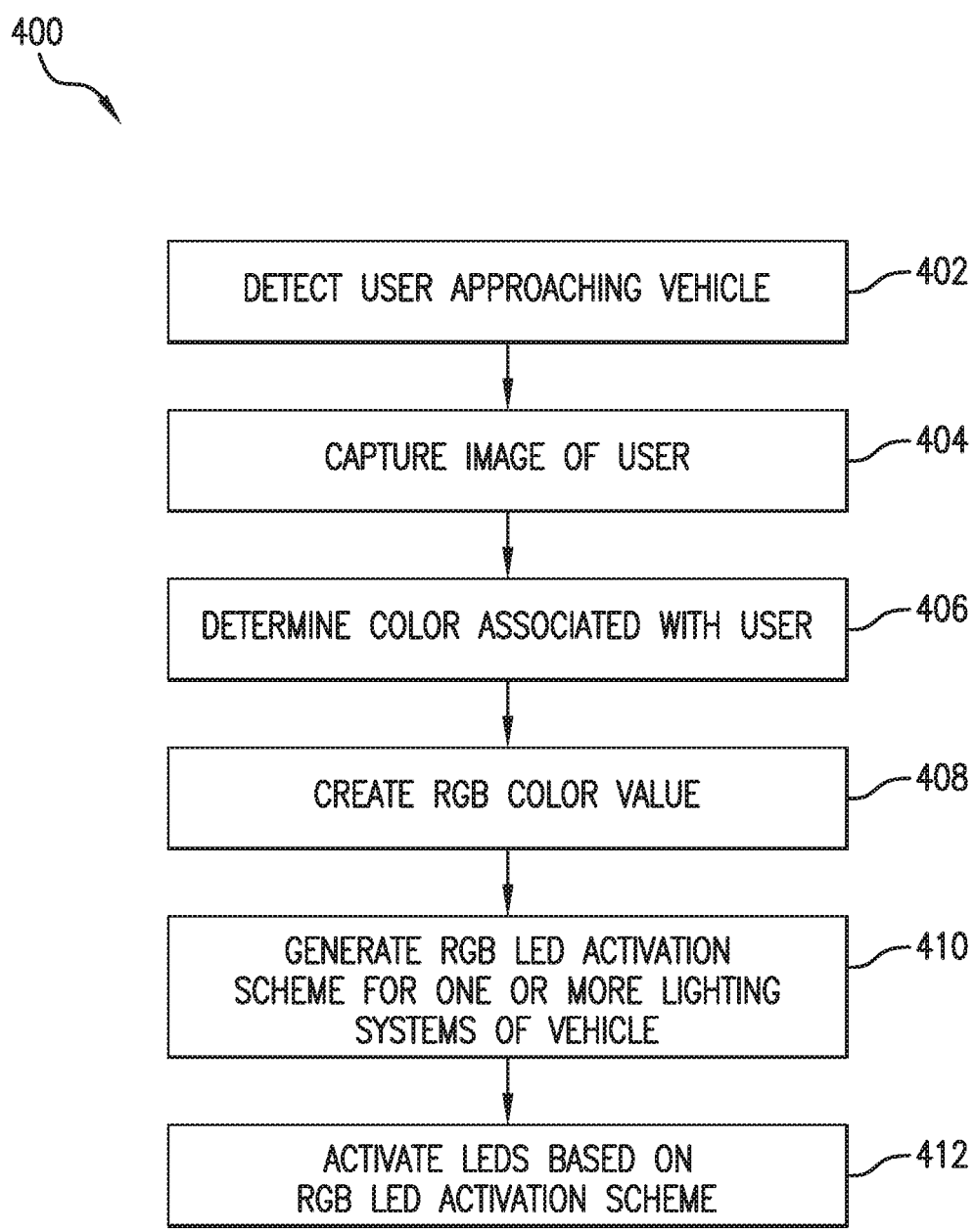
FIG. 4 is a flow diagram of a method of generating a personalized vehicle ambient lighting color for the system of FIG. 3, according to one or more embodiments.

FIG. 4 illustrates a method 400 of personalized vehicle ambient lighting on a vehicle. At 402, the method 400 includes detecting a user approaching a vehicle. As previously discussed, a variety of implementations or embodiments having different sensor types may be used. At 404, an image of the user is captured. A controller may enable target tracking, focus lock, or panning of a camera so that the user is the primary focus or target in the image captured. At 406, a color associated with the user is determined and at 408, corresponding RGB color values are generated or created. These RGB color values are used to generate an LED activation scheme for one or more lighting systems of a vehicle at 410. At 412, the RGB LEDs are activated according to the LED activation scheme.

Figure 5:
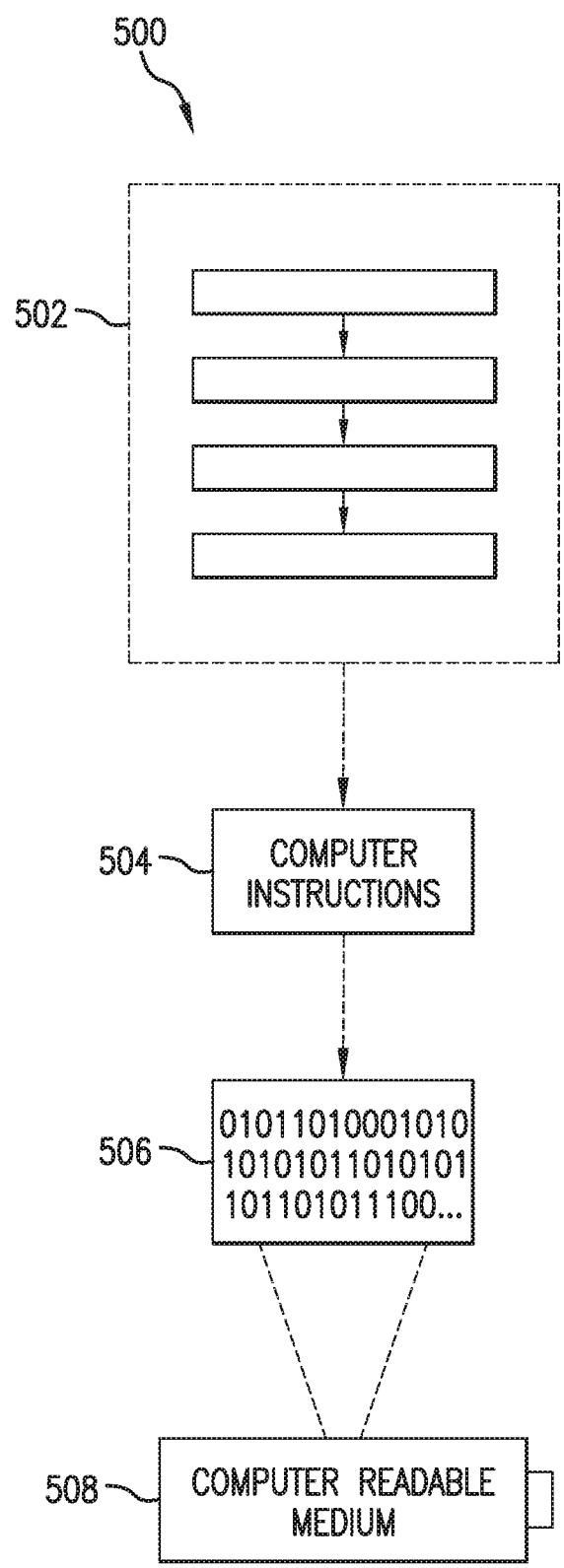
FIG. 5 is an illustration of an example computer-readable medium or computer-readable device including processor-executable instructions configured to embody one or more of the provisions set forth herein, according to one or more embodiments.

Still another embodiment involves a computer-readable medium including processor-executable instructions configured to implement one or more embodiments of the techniques presented herein. An embodiment of a computer-readable medium or a computer-readable device devised in these ways is illustrated in FIG. 5, wherein an implementation 500 includes a computer-readable medium 508, such as a CD-R, DVD-R, flash drive, a platter of a hard disk drive, etc., on which is encoded computer-readable data 506. This computer-readable data 506, such as binary data including a plurality of zero's and one's as shown in 506, in turn includes a set of processor-executable computer instructions 504 configured to operate according to one or more of the principles set forth herein. In one such embodiment 500, the processor-executable computer instructions 504 may be configured to perform a method 502, such as the method 200 of FIG. 2 or the method 400 of FIG. 4. In another embodiment, the processor-executable computer instructions 504 may be configured to implement a system, such as the vehicle ambient lighting system 102 of FIG. 1 or FIG. 3. Many such computer-readable media may be devised by those of ordinary skill in the art that are configured to operate in accordance with the techniques presented herein.

As used in this application, the terms "component", "module," "system", "interface", and the like are generally intended to refer to a computer-related entity, either hardware, a combination of hardware and software, software, or software in execution. For example, a component may be, but is not limited to being, a process running on a processor, a processor, an object, an executable, a thread of execution, a program, or a computer. By way of illustration, both an application running on a controller and the controller may be a component. One or more components residing within a process or thread of execution and a component may be localized on one computer or distributed between two or more computers.

Further, the claimed subject matter is implemented as a method, apparatus, or article of manufacture using standard programming or engineering techniques to produce software, firmware, hardware, or any combination thereof to control a computer to implement the disclosed subject matter. The term "article of manufacture" as used herein is intended to encompass a computer program accessible from any computer-readable device, carrier, or media. Of course, many modifications may be made to this configuration without departing from the scope or spirit of the claimed subject matter.

Figure 6:
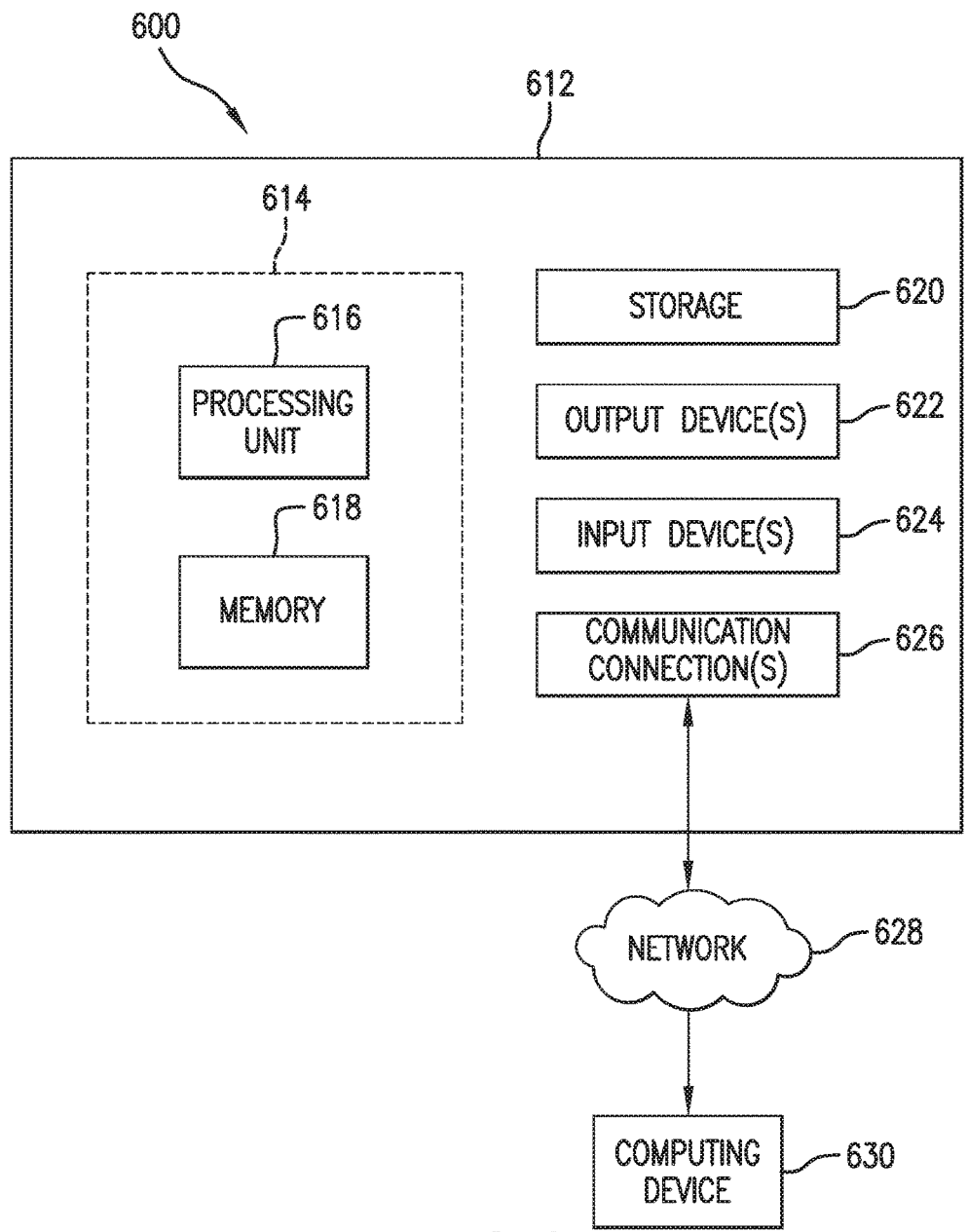
FIG. 6 is an illustration of an example computing environment where one or more of the provisions set forth herein are implemented, according to one or more embodiments.

FIG. 6 and the following discussion provide a description of a suitable computing environment to implement embodiments of one or more of the provisions set forth herein. The operating environment of FIG. 6 is merely one example of a suitable operating environment and is not intended to suggest any limitation as to the scope of use or functionality of the operating environment. Example computing devices include, but are not limited to, personal computers, server computers, hand-held or laptop devices, mobile devices, such as mobile phones, Personal Digital Assistants (PDAs), media players, and the like, multiprocessor systems, consumer electronics, mini computers, mainframe computers, distributed computing environments that include any of the above systems or devices, etc.

Generally, embodiments are described in the general context of "computer readable instructions" being executed by one or more computing devices. Computer readable instructions may be distributed via computer readable media as will be discussed below. Computer readable instructions may be implemented as program modules, such as functions, objects, Application Programming Interfaces (APIs), data structures, and the like, that perform one or more tasks or implement one or more abstract data types. Typically, the functionality of the computer readable instructions are combined or distributed as desired in various environments.

FIG. 6 illustrates a system 600 including a computing device 612 configured to implement one or more embodiments provided herein. In one configuration, computing device 612 includes at least one processing unit 616 and memory 618. Depending on the exact configuration and type of computing device, memory 618 may be volatile, such as RAM, non-volatile, such as ROM, flash memory, etc., or a combination of the two. This configuration is illustrated in FIG. 6 by dashed line 614.

In other embodiments, the computing device 612 includes additional features or functionality. For example, the computing device 612 may include additional storage such as removable storage or non-removable storage, including, but not limited to, magnetic storage, optical storage, etc. Such additional storage is illustrated in FIG. 6 by storage 620. In one or more embodiments, computer readable instructions to implement one or more embodiments provided herein are in storage 620. Storage 620 may store other computer readable instructions to implement an operating system, an application program, etc. Computer readable instructions may be loaded in memory 618 for execution by processing unit 616, for example.

The term "computer readable media" as used herein includes computer storage media. Computer storage media includes volatile and nonvolatile, removable and non-removable media implemented in any method or technology for storage of information such as computer readable instructions or other data. Memory 618 and storage 620 are examples of computer storage media. Computer storage media includes, but is not limited to, RAM, ROM, EEPROM, flash memory or other memory technology, CD-ROM, Digital Versatile Disks (DVDs) or other optical storage, magnetic cassettes, magnetic tape, magnetic disk storage or other magnetic storage devices, or any other medium which may be used to store the desired information and which may be accessed by device 612. Any such computer storage media is part of device 612.

The term "computer readable media" includes communication media. Communication media typically embodies computer readable instructions or other data in a "modulated data signal" such as a carrier wave or other transport mechanism and includes any information delivery media. The term "modulated data signal" includes a signal that has one or more of its characteristics set or changed in such a manner as to encode information in the signal.

Device 612 includes input device(s) 624 such as keyboard, mouse, pen, voice input device, touch input device, infrared cameras, video input devices, or any other input device. Output device(s) 622 such as one or more displays, speakers, printers, or any other output device may be included with device 612. Input device(s) 624 and output device(s) 622 may be connected to device 612 via a wired connection, wireless connection, or any combination thereof. In one or more embodiments, an input device or an output device from another computing device may be used as input device(s) 624 or output device(s) 622 for computing device 612. Device 612 may include communication connection(s) 626 to facilitate communications with one or more other devices 630, such as through network 628, for example.

Although the subject matter has been described in language specific to structural features or methodological acts, it is to be understood that the subject matter of the appended claims is not necessarily limited to the specific features or acts described above. Rather, the specific features and acts described above are disclosed as example embodiments.

Various operations of embodiments are provided herein. The order in which one or more or all of the operations are described should not be construed as to imply that these operations are necessarily order dependent. Alternative ordering will be appreciated based on this description. Further, not all operations may necessarily be present in each embodiment provided herein.

As used in this application, "or" is intended to mean an inclusive "or" rather than an exclusive "or". Further, an inclusive "or" may include any combination thereof (e.g., A, B, or any combination thereof). In addition, "a" and "an" as used in this application are generally construed to mean "one or more" unless specified otherwise or clear from context to be directed to a singular form. Additionally, at least one of A and B and/or the like generally means A or B or both A and B. Further, to the extent that "includes", "having", "has", "with", or variants thereof are used in either the detailed description or the claims, such terms are intended to be inclusive in a manner similar to the term "comprising".

Further, unless specified otherwise, "first", "second", or the like are not intended to imply a temporal aspect, a spatial aspect, an ordering, etc. Rather, such terms are merely used as identifiers, names, etc. for features, elements, items, etc. For example, a first channel and a second channel generally correspond to channel A and channel B or two different or two identical channels or the same channel. Additionally, "comprising", "comprises", "including", "includes", or the like generally means comprising or including, but not limited to.

It will be appreciated that various of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

What is claimed is:

1. A system for personalized vehicle ambient lighting on a vehicle, comprising:
    a vehicle entry sensor detecting presence information associated with a user;
    a camera comprising an image sensor capturing image color information from an image taken by the camera;
    a controller having a processor operably connected to the camera and controlling the camera to take the image when the user is in view of the camera;
    an image processor extracting image color information associated with the user from the image and creating red, green, blue (RGB) color values indicative of a color associated with the user, wherein the processor for the controller generates a light emitting diode (LED) activation scheme based on the RGB color values associated with the user;
    a first plurality of red, green, blue (RGB) LEDs; and
    a first LED driver connected to the controller and the first plurality of RGB LEDs and activating portions of the first plurality of RGB LEDs based on the LED activation scheme to produce personalized vehicle ambient lighting having a color matching the color associated with the user.

2. The system of claim 1, comprising:
    a second plurality of RGB LEDs; and
    a second LED driver connected to the controller and the second plurality of RGB LEDs and activating portions of the second plurality of RGB LEDs based on the LED activation scheme.

3. The system of claim 2, wherein the second LED driver activates portions of the second plurality of RGB LEDs based on the LED activation scheme to produce personalized vehicle ambient lighting having a color different than the color of the first plurality of RGB LEDs.

4. The system of claim 1, wherein the first plurality of RGB LEDs is associated with a puddle light system, an internal ambient lighting system, or an external ambient lighting system.

5. The system of claim 1, wherein the vehicle entry sensor detects the presence information associated with the user based on a proximity of a key fob from the vehicle entry sensor.

6. The system of claim 5, wherein the processor for the controller generates the LED activation scheme based on a profile associated with the key fob when image color information associated with the user is unavailable.

7. The system of claim 1, wherein the vehicle entry sensor is a touch sensor which detects the presence information associated with the user based on contact between the user and a door or door handle of the vehicle.

8. The system of claim 1, wherein the controller controls the camera to pan and motion track the user or focus lock on the user while the user is moving.

9. The system of claim 1, wherein the image processor extracts image color information associated with an article of clothing of the user and creates the RGB color values indicative of a color associated with the article of clothing, and wherein the processor for the controller generates the LED activation scheme based on the RGB color values associated with the article of clothing.

10. The system of claim 1, wherein the processor for the controller generates the LED activation scheme based on a time of day, a weather report, a predetermined color palette, or randomly when image color information associated with the user is unavailable.

11. The system of claim 10, comprising a telematics unit receiving the time of day or the weather report.

12. The system of claim 10, wherein the controller comprises a memory storing the predetermined color palette.

13. The system of claim 1, wherein the processor for the controller generates the LED activation scheme on a continually updated basis based on a speed at which the user is walking, and wherein the LED activation scheme includes an adjustment to a brightness, an intensity, or a duration of activation based on the speed of the user.

14. The system of claim 1, wherein the LED activation scheme includes an adjustment to a brightness, an intensity, or a duration of activation based on a proximity of the user to the vehicle.

15. A method for personalized vehicle ambient lighting on a vehicle, comprising:
    detecting presence information associated with a user;
    capturing image color information from an image taken by a camera such that the user is within the image;
    extracting image color information associated with the user from the image;
    creating red, green, blue (RGB) color values indicative of a color associated with the user;
    generating a light emitting diode (LED) activation scheme based on the RGB color values associated with the user; and
    activating portions of a plurality of RGB LEDs based on the LED activation scheme.

16. The method of claim 15, wherein the plurality of RGB LEDs is associated with a puddle light system, an internal ambient lighting system, or an external ambient lighting system.

17. The method of claim 15, comprising:
    identifying an article of clothing of the user;
    extracting image color information associated with the article of clothing of the user from the image;
    creating RGB color values indicative of a color associated with the article of clothing; and
    generating the LED activation scheme based on the RGB color values associated with the article of clothing.

18. The method of claim 17, comprising:
    extracting predominant image color information and secondary image color information associated with the user from the image;
    creating RGB color values indicative of the predominant color and the secondary color; and
    generating the LED activation scheme based on the RGB color values associated with predominant color or the secondary color.

19. The method of claim 18, comprising:
    generating a second LED activation scheme based on the secondary color; and
    activating portions of a second plurality of RGB LEDs based on the second LED activation scheme.

20. A method for personalized vehicle ambient lighting on a vehicle, comprising:
    detecting presence information associated with a user;
    capturing image color information from an image taken by the camera such that the user is within the image;
    extracting a first and second image color information associated with the user from the image;
    creating first and second red, green, blue (RGB) color values indicative of a first and second color associated with the user based on the extracted first and second image color information;
    generating a first and second light emitting diode (LED) activation scheme based on the first and second RGB color values associated with the user; and
    activating portions of a first and second plurality of RGB LEDs based on the first and second LED activation schemes, respectively.

* * * * *